United States Patent [19]

Litrico

[11] Patent Number: 5,207,017
[45] Date of Patent: May 4, 1993

[54] MARINE LIFE TRAPS

[76] Inventor: Biagio Litrico, P.O. Box 742, Fernandina Beach, Fla. 32034

[21] Appl. No.: 903,742

[22] Filed: Jun. 25, 1992

[51] Int. Cl.5 .............................................. A01K 69/00
[52] U.S. Cl. ..................................... 43/100; 43/102
[58] Field of Search ................ 43/100, 101, 102, 103, 43/104, 105, 106

[56] References Cited

U.S. PATENT DOCUMENTS

| | | | |
|---|---|---|---|
| 2,489,856 | 11/1949 | Buford | 43/102 |
| 3,541,721 | 11/1970 | Sexauer | 43/100 |
| 3,740,892 | 6/1973 | Cox et al. | 43/100 |
| 4,445,295 | 5/1984 | Litrico | 43/100 |
| 4,486,973 | 12/1984 | Faucillon | 43/100 |
| 4,587,758 | 5/1986 | Ponzo | 43/100 |
| 4,821,451 | 4/1989 | Matson | 43/102 |
| 4,831,774 | 5/1989 | Gonzalez | 43/100 |

Primary Examiner—Richard K. Seidel
Assistant Examiner—Chuck Y. Mah
Attorney, Agent, or Firm—Webb, Burden, Ziesenheim & Webb

[57] ABSTRACT

A trap for catching marine life species having a bottom member, a guide member attached to the bottom member, a top enclosure slideably received on the guide member wherein the top enclosure is guided between a closed position and in contact with the bottom member to an open position spaced form and above the bottom member. The top enclosure includes a frame and mesh members removably attached to the frame whereby different mesh sizes can be inserted as required. The frame can be collapsible and flexible. Further, a buoyancy member can be positioned at a lower end of the top enclosure permitting the trap to be used in shallow water.

24 Claims, 4 Drawing Sheets

MARINE LIFE TRAPS

FIELD OF THE INVENTION

This invention realtes to marine life traps and, more particularly, to a hand operated trap for marine life such as crabs, shrimp, lobster and like, which may be lured by bait into a trap.

DESCRIPTION OF THE PRIOR ART

Traps for use in trapping crabs, lobsters, and other marine life that can be lured by bait are old and well known. Such devices generally involve a baited net arrangement of some sort. The most common form of crab and lobster traps are pot types with a funnel ingress and chamber. U.S. Pat. No. 4,445,295 discloses a less common form of marine life traps having a top and a bottom that are separated in a baited portion and are drawn closed by a pull rope arrangement after the passage of a preset time or by the operator. A mesh or netting surrounds both the top and the bottom. Both types of traps are bulky to transport and store and, thus, limit the number of traps a fisherman can set. Therefore, it is an object of my invention to make a trap that is not as bulky as the prior art.

The latter type of marine traps also cannot operate in shallow water, say several feet of water or less, because they require a flotation device in an upper portion of or above the trap to maintain the trap in an open position. Therefore, it is also an object of my invention to have a marine trap which can operate in low levels of water.

The mesh used in the latter type of trap is fixedly attached to the top and the bottom. The mesh permits certain sized fish caught in the trap to escape. In many areas of the United States the mesh size is mandated by law and can vary depending on where the traps are set. Traps set in one bay may not be permitted in a bay several miles away because of different mesh requirements. Therefore, it is also an object of my invention to provide a marine trap having replaceable mesh of varying sizes.

SUMMARY OF THE INVENTION

My invention is a trap for catching marine life species including a bottom member, a guide attached to the bottom member and a top enclosure slideably received on the guide. The top enclosure, which can be substantially conically shaped or pyramid shaped and can further be collapsible, is guided between a closed position and contact with the bottom member and an open position spaced from and above the bottom member. The top enclosure includes a frame and a meshed member can be removably attached to the frame. The mesh can be received by a mesh receiving recess in the frame. The top enclosure further includes a buoyancy member attached to the top enclosure whereby the buoyancy member maintains the top enclosure in the open position when the enclosure is placed in water. In one preferred embodiment, the buoyancy member is positioned at a lower end of the top enclosure.

The top enclosure can include a plurality of substantially triangular shaped frames each having a leading edge, a following edge and a base edge. The leading edge of one frame attaches to a following edge of an adjacent frame and the base edges form a lower edge of the top enclosure. Alternatively, the top enclosure can have a frame with a flexible member having a leading edge and a following edge, where the member is substantially flat when collapsed and when the frame is flexed and the leading edge is attached to the following edge, the top enclosure is formed. The collapsed frame can include two concentric curved sides having their ends joined by respective straight sides, and when flexed forms a conical shape. Alternatively, the flexible member can include plurality of triangular sections flexibly connected to each other whereby when flexed forms a pyramid shape.

The trap can further include a pair of diametrically opposed guide rods received by two slots provided in the top enclosure. Stops are attached to the guide rods. The stops can be adjustable to adjust the opening between the top enclosure and the bottom member. Further, the trap can include a device for maintaining the top enclosure in a closed position. This device can include a ring attached to the bottom member a rope having one end fixed to the top enclosure passing through the ring and another end of the rope passing through an upper central portion of the top enclosure.

DESCRIPTION OF THE PREFERRED EMBODIMENTS

Figure 1:
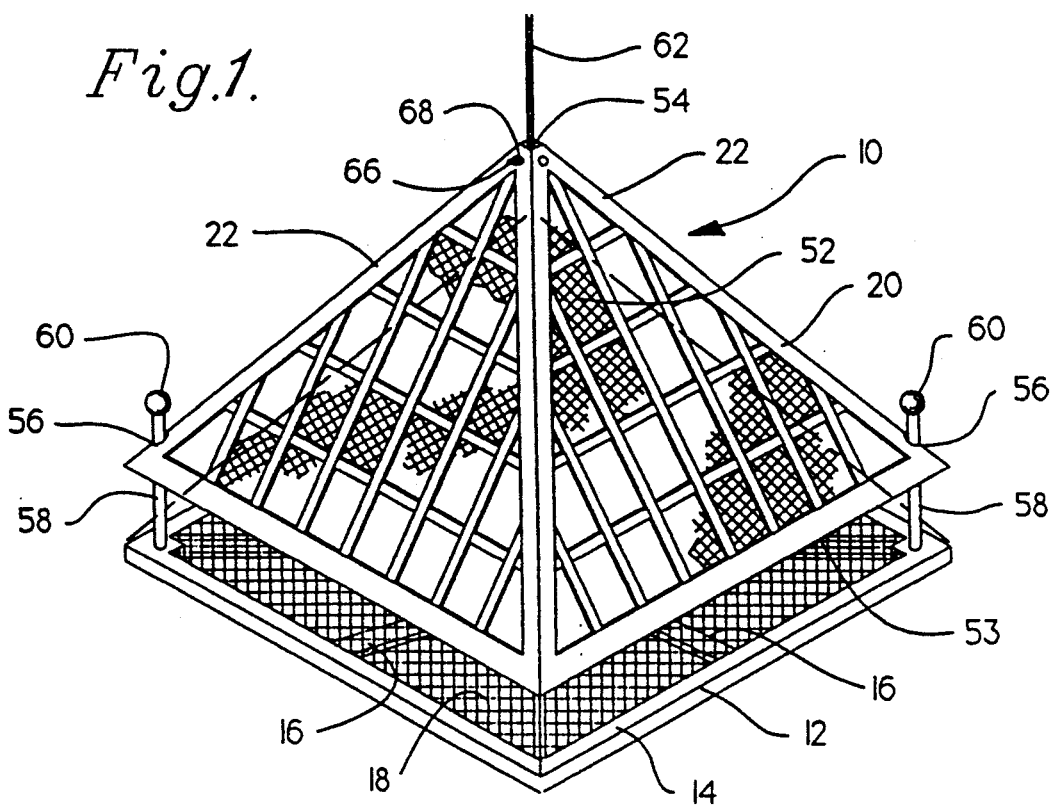
FIG. 1 is an isometric view of a first embodiment of a marine trap according to the present invention.
Figures 2, 3, 4:
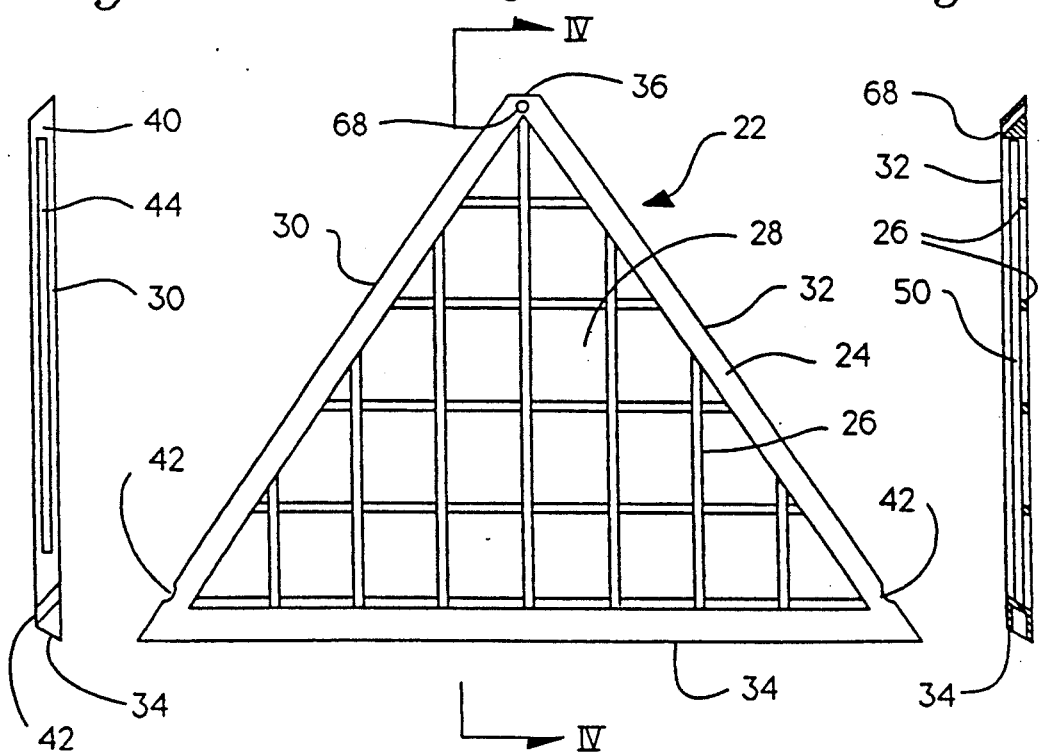
FIG. 2 is a front view of a triangular shaped panel made in accordance with the present invention.
FIG. 3 is a side view of the triangular shaped panel shown in FIG. 2.
FIG. 4 is a section taken along lines IV—IV in FIG. 2.
Figure 5:
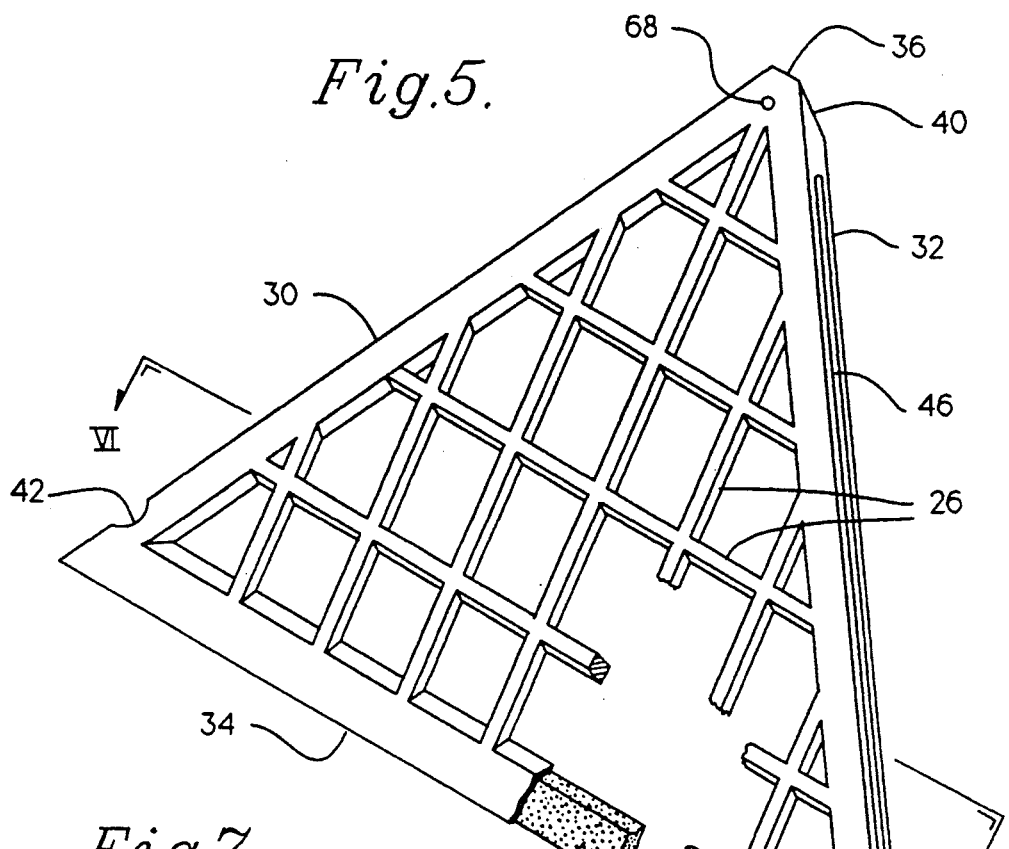
FIG. 5 is an isometric view, partially in section, of the triangular shaped panel shown in FIG. 2.
Figure 7:
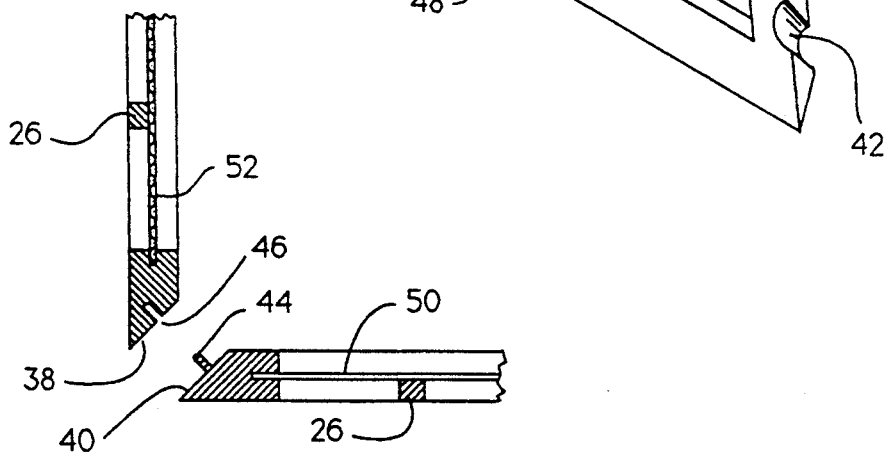
FIG. 7 is a top view, partially in section, of adjacent triangular shaped panels.
Figure 6:
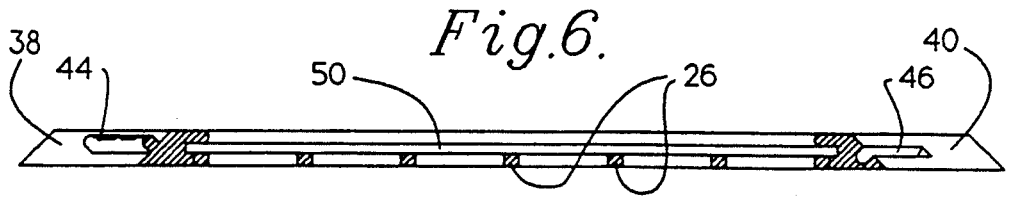
FIG. 6 is a section taken along lines VI—VI in FIG. 5.

FIG. 1 shows a marine trap 10 for catching marine life species made in accordance with the present invention. The marine trap 10 includes a planar bottom member 12 having a square frame 14 with intersecting cross members 16. A mesh or netting 18 attaches to frame 14. A pyramid shaped top enclosure 20 is positioned above the planar member 12. Four substantially triangular sections 22 attach to one another along their respective edges to form the enclosure 20.

As shown in FIGS. 2-7, each triangular section 22 includes a triangular frame 24 having a plurality of crossbraces 26 that form polygon shaped apertures 28. Frame 24 has a leading edge 30, a following edge 32 and a base edge 34. A flat section 36 is positioned at the apex of frame 24 opposite the base 34. The leading edge 30 and the following edge 32 each have mitred surfaces 38, 40. A semicircular slot 42 is provided on edges 30, 32 near the base edge 34. The leading edge 30 has a flat key 44 extending from the mitred surface 38; and the following edge 32 has a keyway 46 positioned on the mitred surface 40 that receives the key 44 of an adjacent triangular section 22. The base edge 34 has a buoyancy strip or member 48 positioned inside frame 24. The buoyancy member 48 has a density less than water. A mesh receiving recess 50 is defined about the inner perimeter of frame 24. The recess 50 removably receives an outer edge of a triangular shaped mesh 52. The size of the mesh can vary depending on what species is being trapped and the fishing laws. In some instances no mesh may be required.

Four triangular sections 22 form the enclosure 20. Specifically, keys 44 are removably received by respective keyways 46 of adjacent triangular sections 22 so that the adjacent leading edges 30 and following edges 32 abut one another, thereby forming the pyramid shape with the base edges 34 defining a lower edge 53 of the enclosure 20. The flat sections 36 define a hole 54 at the pyramid apex. The adjacent triangular sections 22 can be fastened together by pins, clips or rope and the like to prevent the enclosure 18 from coming apart. Adjacent semicircular slots 42 form circular guide slots 56 near the corners of the bases 32 of frames 24.

Two diagonally spaced cylindrical guides 58 removably attach to opposed corners of the planar member 12 and slideably pass through diagonally opposed slots 42. A spherical shaped stop 60 is provided at an end of each guide 58. The guides 58 guide the enclosure 20 between a closed position in contact with the planar member 12 and an open position spaced from and above the planar member 12. In the open position each stop 60 contacts respective sides of frame 24 preventing the enclosure 20 from moving further away from the planar member 12.

Figure 8:
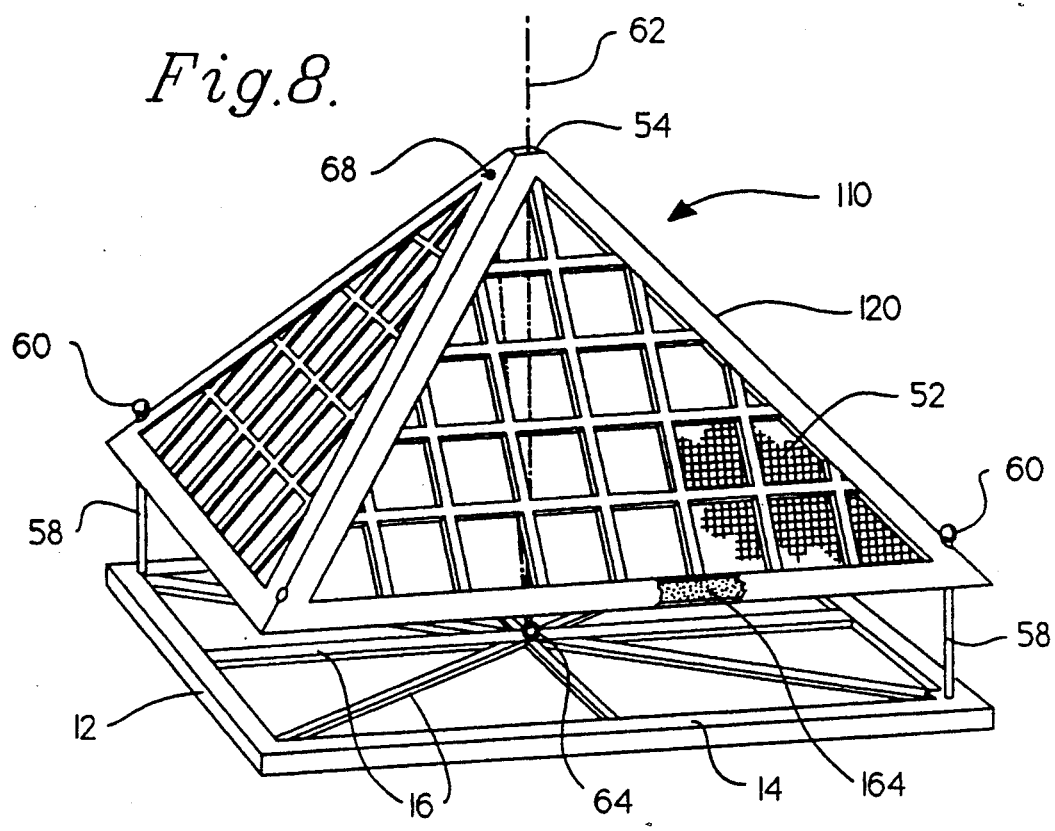
FIG. 8 is an isometric view of a second embodiment of a marine trap according to the present invention.

A rope 62 passes through both hole 54 and a ring 64 centrally positioned on flat member 12 (see FIG. 8). An end 66 of the rope 62 passes a hole 68 near the top of frame 24. A knot is tied at the end 66 of the rope 62 thereby preventing the rope end 66 from passing through hole 68. The other end of the rope is sufficient in length to extend beyond the surface of the water.

In operation, the trap 10 is placed in a marine environment, such as the ocean, with the flat member resting on the ocean floor. The buoyancy members 48 are buoyant enough to hold TM the enclosure suspended above the planar member 12 and maintain the trap 10 in the open position. When a marine creature such as a lobster enters the trap, the rope is pulled upward closing the trap whereby the lower edge 53 of the enclosure 20 contacts bottom member 12.

Since the buoyancy member 48 provided at the lower edge or lower end of the enclosure 20, as opposed to the top, the trap 10 can be used in shallow water, even where a portion of the trap 10 extends above the water surface. This cannot occur when a buoyancy member is provided near the apex of the pyramid structure, such as in U.S. Pat. No. 4,445,295.

Figure 9:
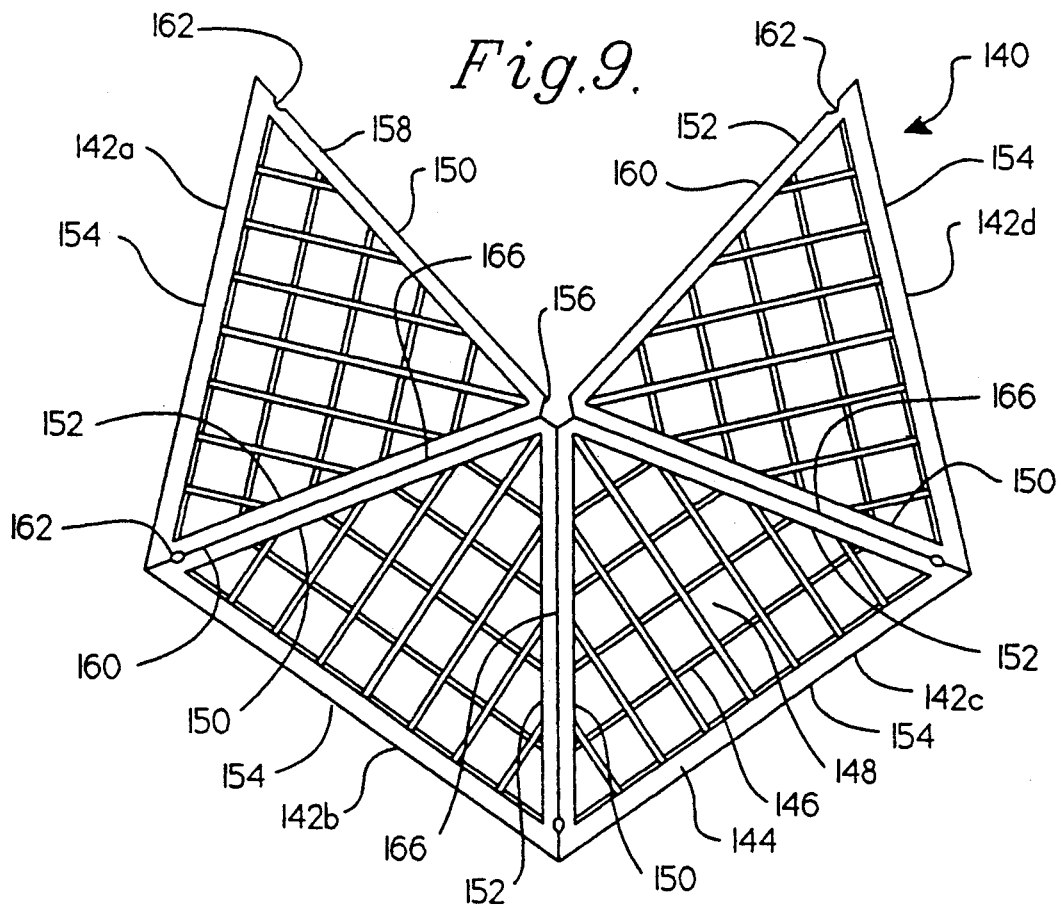
FIG. 9 is a top view of a flexible top enclosure made of triangular sections used to form the pyramid shaped top enclosure shown in FIG. 8.

FIGS. 8 and 9 show a second embodiment of a trap 110 made in accordance with the present invention. Trap 110 is similar to trap 10 where the only difference is that trap 110 has a pyramid shaped top enclosure 120 made of one flexible piece 140 as opposed to four triangular sections 22. Accordingly, like reference numerals will designate like parts and only the flexible member 140 will be discussed.

The flexible member 140 has four triangular shaped sections 142a, 142b, 142c, and 142d. Each triangular section 142a–d includes a triangular frame 144 having a plurality of crossbraces 146 that form polygon shaped apertures 148. Frame 144 has a leading edge 150, a following edge 152 and a base edge 154. A flat section 156 is positioned at the apex of frame 144 opposite the base 154. The leading edge 150 and the following edge 152 each have mitred surfaces 158, 160. A semicircular slot 162 is provided on each side 150, 152 near the base edge 154. The base edge 154 has a buoyancy strip or member 164 positioned inside frame 144. The buoyancy member 164 has a density less than water. A mesh receiving recess is defined about the inner perimeter of frame 144. The recess removably receives the outer edge of the triangular shaped mesh 26.

The triangular shaped sections 142a–d are flexibly connected to each other by three flexural members 166, which join respective second sides 152 of triangular sections 142a–c to leading edges 150 of triangular sections 142b–d. The flexural members 166 can be made of, for example, rubber, plastic or a hinge. The leading edges 150 of triangular section 142a has a flat key extending from the mitred surfaces 158; and the following edges 152 of triangular section 142d has a keyway positioned on the mitred surface 160. The key/keyway arrangement is the same as in trap 10. When trap 110 is not in use or in storage, the flexible member can be in a collapsed flat state as shown in FIG. 9.

When it is desired to assemble the pyramid shaped enclosure 120, as shown in FIG. 8, the flexible member 140 is flexed to form a pyramid type structure. Flat sections 156 define hole 54 at the pyramid apex. The key is removably received by the keyway and the leading edge 150 of triangular section 142a abuts the following edge 152 of triangular section 142d and the base edges 154 define a lower edge of the enclosure 120. As in the previous case, a rope or other fastening device can be used to fasten sections 142a to 142d to prevent the enclosure from opening up. Mesh can then be removably received by the recesses in frames 144. Then the base of the top enclosure 120 is placed over the bottom planar member 12. Guides 58 are then passed through guide slots 56. The lower ends of the guides 58 removably attach to the bottom planar 12. The rope 62 passes through hole 54, ring 64 and hole 68.

Figure 10:
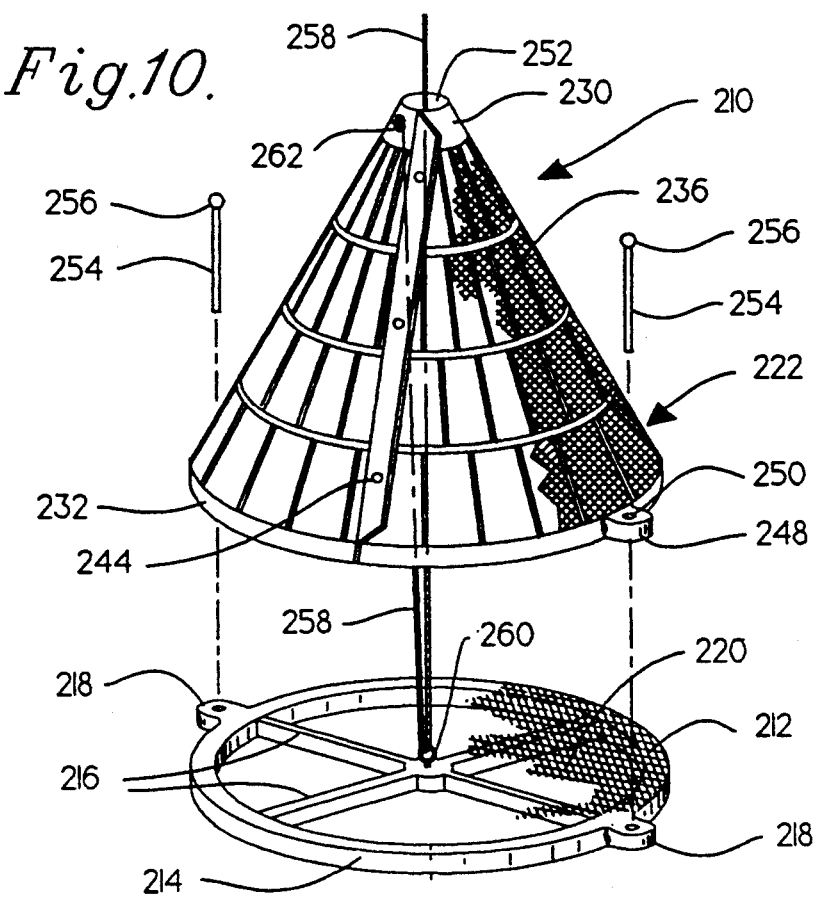
FIG. 10 is an isometric view of a third embodiment according to the present invention.
Figure 11:
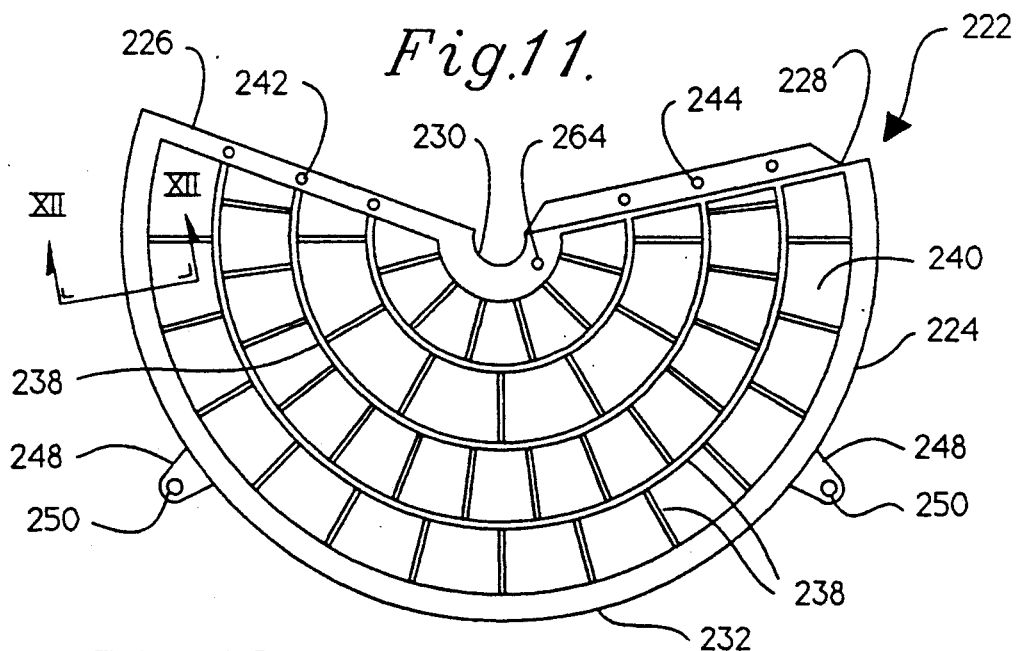
FIG. 11 is a top view of a flexible top enclosure used to form the cone shaped top enclosure shown in FIG. 10.
Figure 12:
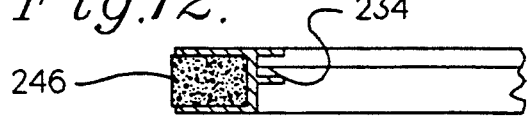
FIG. 12 is a section taken along lines XII—XII in FIG. 11.

A third embodiment of the present invention is shown in FIGS. 10–12. FIG. 10 shows a marine trap 210 having a planar bottom member 212 made up of a circular frame 214 with two intersecting cross members 216. Two guide attaching plates 218 depend from frame 214 and are spaced 180 degrees apart. A mesh or netting 220 similar to that used in the prior embodiments attaches to frame 214. A conical shaped top enclosure 222 is positioned above the planar member 212.

Like the second embodiment, the enclosure 222 is collapsible. In the collapsed flat state, the enclosure 222 includes a flexible frame 224, which is a four-sided structure having a straight leading edge 226 and a following edge 228 connected at their ends to a first curved edge 230 and a second curved edge 232. The curved edges 230, 232 are concentric arcs where edge 230 is shorter than edge 232. Edges 226 and 228 have equal lengths. A mesh receiving recess 234, which removably receives the outer edge of a mesh 236, is defined about the inner perimeter of frame 224. Flexible crossbraces 238 extend from the sides forming apertures 240.

Edge 226 includes three holes 242 adapted to removably receive three pins 244 located on side 228. A flexible buoyancy strip 246, similar to buoyancy strip 48, is provided on edge 232. Two guide receiving plates 248, each having a guide receiving hole 250, depend from edge 232 and are spaced approximately 180 degrees apart.

To form the conical shaped enclosure 222, frame 224 is flexed into the shape of a cone and pins 244 are placed in the holes 242 attaching edge 226 to edge 228. Pins 244 should form a press fit or a snap fit in holes 242 so that the enclosure 222 maintains its cone shape. Edge 232 corresponds to the lower edge of the cone and the outer surfaces of edge 230 defines a hole 252 at the apex of the cone. Pins 244 need only be pulled out of holes 242 to collapse the enclosure 222.

Two diagonally spaced cylindrical guides 254 removably attach to respective plates 218. Likewise, guides 254 slideably pas through holes 250 of plates 248, respectively. A spherical shaped stop 256 is attached to a top end of each guide 254. The guide 254/stop 256 arrangement operates in the same manner as the guide 58/stop 60 arrangement of trap 10. A rope 258 passes through both hole 252 and a ring 260 centrally positioned on the flat member 212. An end 262 of the rope 258 passes through a hole 264 located on side 230. A knot is tied on the end 262 of the rope 258. The trap 210 operates exactly the same as trap 10 and can be assembled in the same manner as trap 110.

It is contemplated that the frames of all of the embodiments can be made from a molded plastic material having a density greater than water. Alternatively, the planar members can be made of a material having a density greater than water while the top enclosures can have a density less than water.

Having described the presently preferred embodiments of my invention, it is to be understood that it may otherwise be embodied within the scope of the appended claims.

I claim:

1. A trap for catching marine life species comprising:
    a bottom member;
    a guide attached to said bottom member;
    a top enclosure slideably received on said guide wherein said top enclosure is guided between a closed position in contact with said bottom member and an open position spaced form and above said bottom member, said top enclosure comprising a collapsible frame; and
    a buoyancy member attached to a lower end of said top enclosure, whereby said buoyancy member maintains said top enclosure in the open position when said enclosure is placed in water.

2. The trap of claim 1 wherein said enclosure is substantially conical shaped.

3. The trap of claim 1 wherein said top enclosure is substantially pyramid shaped.

4. The trap of claim 1 further comprising a meshed member removably attaches to said frame.

5. The trap of claim 4 wherein said mesh is received by a mesh receiving recess provided in said frame.

6. The trap of claim 4 wherein said top enclosure comprises a plurality of substantially triangular shaped frames each having a leading edge, a following edge and a base edge, wherein the leading edge of one frame attaches to the following edge of an adjacent frame and the base edge forming a lower edge of said top enclosure.

7. The trap of claim 6 wherein said collapsible frame comprises a flexible member having a leading edge and a following edge, said member is substantially flat when collapsed, and when said frame is flexed and said leading edge attaches to said following edge, said top enclosure is formed.

8. The trap of claim 1 wherein said top enclosure comprises a plurality of substantially triangular shaped frames each having a leading edge, a following edge and a base edge, wherein the leading edge of one frame attaches to the following edge of an adjacent frame and the base edges of said frames forming a lower edge of said top enclosure.

9. The trap of claim 1 wherein said frame comprises a flexible member having a leading edge and a following edge, said member is substantially flat when collapsed, and when said frame is flexed and said leading edge attaches to said following edge, said top enclosure is formed.

10. The trap of claim 9 wherein said formed top enclosure is substantially conical shaped.

11. The trap of claim 10 wherein said collapsed frame comprises two concentric curved edges having their ends joined by respective straight edges.

12. The trap of claim 9, comprising a plurality of triangular sections flexibly connected to each other.

13. The trap of claim 12 wherein said top enclosure is substantially pyramid shaped.

14. The trap of claim 1 wherein said guide comprises a pair of diametrically opposed guide rods, said top enclosure having two slots to receive said guide rods and stop means attached to said guide rods.

15. The trap of claim 1 further comprising closing means for maintaining said top enclosure in a closed position.

16. The trap of claim 15 wherein said closing means comprises a ring attached to said bottom member, a rope having one end fixed to said top enclosure and passing through said ring and another end of said rope passing through an upper central portion of said top enclosure.

17. A trap for catching marine life species comprising:
    a bottom section;
    a guide attached to said bottom member;
    a top member slideably received on said guide, said top member having a lower edge, wherein said top enclosure is guided between a closed position where said lower edge is in contact with said bottom member and an open position spaced from and above said bottom member; and
    a buoyancy member attached to said enclosure near said lower edge so that when said trap is placed in shallow water a portion of said top enclosure can extend thereabove while said buoyancy member maintains said top enclosure in an open position.

18. A trap for catching marine life species comprising:
    a bottom member;
    a guide attached to said bottom member; and
    a top enclosure slideably received on said guide wherein said top enclosure is guided between a closed position in contact with said bottom member and an open position spaced form and above said bottom member, said top enclosure comprising a collapsible frame having a plurality of substantially triangular shaped frames each having a leading edge, a following edge and a base edge, wherein the leading edge of one frame attaches to the following edge of an adjacent frame and the base edges of said frames forming a lower edge of said top enclosure.

19. A trap for catching marine life species comprising:
   a bottom member;
   a guide attached to said bottom member; and
   a top enclosure slideably received on said guide wherein said top enclosure is guided between a closed position in contact with said bottom member and an open position spaced from and above said bottom member, said top enclosure comprising a collapsible frame including a flexible member having a leading edge and a following edge, said flexible member being substantially flat when collapsed, and when said frame is flexed and said leading edge attaches to said following edge, said top enclosure is formed.

20. The trap of claim 19 wherein said formed top enclosure is substantially conical shaped.

21. The trap of claim 20 wherein said collapsed frame comprises tow concentric curved edges having their ends joined by respective straight edges.

22. The trap of claim 19 comprising a plurality of triangular sections flexibly connected to each other.

23. The trap of claim 22 wherein said top enclosure is substantially pyramid shaped.

24. A trap for catching marine life species comprising:
   a bottom member;
   a guide attached to said bottom member;
   a top enclosure slideably received on said guide wherein said top enclosure is guided between a closed position in contact with said bottom member and an open position spaced from and above said bottom member, said top enclosure comprising a collapsible frame; and
   a buoyancy member attached to a lower end of said top enclosure, whereby said buoyancy member maintains said atop enclosure in the open position when said enclosure is placed in water, and
   a mesh member removably attached to said top enclosure.

* * * * *

UNITED STATES PATENT AND TRADEMARK OFFICE
CERTIFICATE OF CORRECTION

PATENT NO. : 5,207,017
DATED : May 4, 1993
INVENTOR(S) : Biagio Litrico

It is certified that error appears in the above-identified patent and that said Letters Patent is hereby corrected as shown below:

TITLE PAGE:

Abstract Line 6 "form" should read --from--.

Column 1 Line 5 "realtes" should read --relates--.

Column 2 Line 7 before "plurality" insert --a--.

Column 2 Line 17 after "member" insert --,--.

Column 3 Line 48 after "hold" delete --TM--.

Column 5 Line 19 "pas" should read --pass--.

Claim 1 Line 47 Column 5 "form" should read --from--.

Claim 4 Line 59 Column 5 "attaches" should read --attached--.

Claim 17 Line 44 Column 6 "section" should read --member--.

Claim 18 Line 64 Column 6 "form" should read --from--.

Claim 21 Line 2 Column 8 "tow" should read --two--.

Claim 24 Line 20 Column 8 "atop" should read --top--.

Signed and Sealed this

Fifteenth Day of February, 1994

*Attest:*

BRUCE LEHMAN

*Attesting Officer*     *Commissioner of Patents and Trademarks*